March 23, 1943. R. TAUTY 2,314,433
DEVICE FOR AIRCHUTES
Filed May 16, 1940

Inventor
René Tauty,
By Bailey Parson
Attorneys

Patented Mar. 23, 1943

2,314,433

UNITED STATES PATENT OFFICE 2,314,433

DEVICE FOR AIRCHUTES

Rene Tauty, Clichy, France; vested in the Alien Property Custodian

Application May 16, 1940, Serial No. 335,599
In France June 9, 1939

1 Claim. (Cl. 244—148)

The present invention relates to parachute systems and in particular the devices intended to contain the parachute proper and the supports or shroud lines thereof in the folded position, whereby the whole can be adapted to the back of a parachutist or in any other desired position through suitable means (such as a belt, a harness, or the like).

The chief object of the present invention is to provide a device of this type which is better adapted to meet the requirements of practice than those used for the same purpose up to the present time, and, in particular which occupies less space and does not interfere seriously with the movements of the person wearing this device.

According to an essential feature of the present invention, the device in question includes a container intended to contain the parachute proper, that is to say the canopy, while other elements, and in particular a portion of the supporting elements or shroud lines attached to this parachute proper, are arranged on the outside of this container.

According to another feature of the invention, the device is so arranged that, in the folded position of the parachute system, it is possible to have access to the supporting elements or shroud lines without having to touch the parachute proper.

According to still another feature of the present invention, the supporting elements or straps are, in the folded position of the parachute system, stored up in a chamber which can be opened by a Zip fastener or the like, this chamber being preferably distinct from the bag which contains the parachute canopy.

Other features of the present invention will result from the following detailed description of some specific embodiments thereof.

Preferred embodiments of the present invention will be hereinafter described, with reference to the accompanying drawing, given merely by way of example, and in which.

Figures 1, 2:
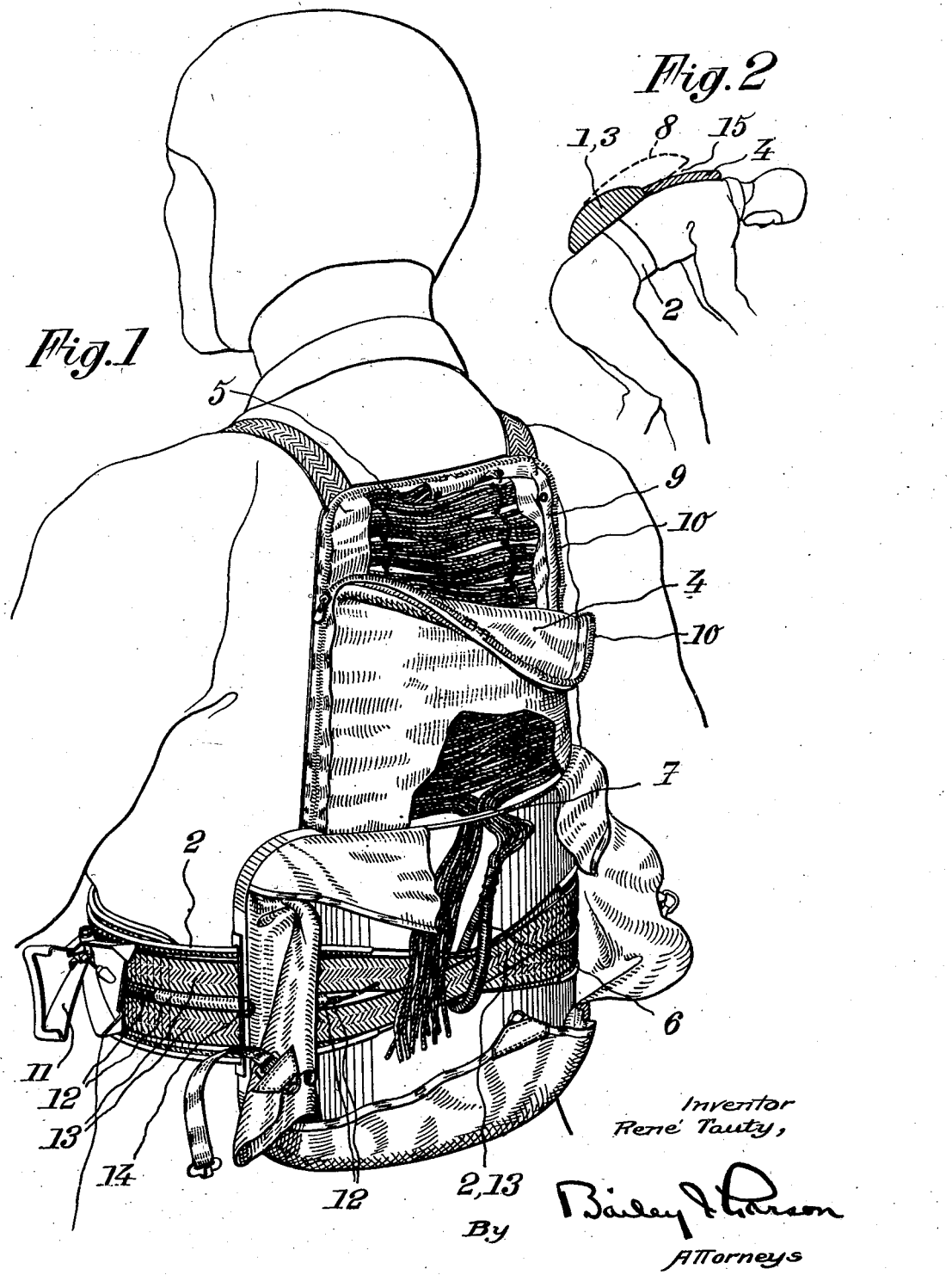
Fig. 1 is a perspective view, with parts cut off, of a parachute system adapted to be worn on the back and made according to the present invention.
Fig. 2 is a diagrammatic perspective view illustrating the operation of the parachute system according to the invention.

In the following description with reference to the drawing it will be supposed that the invention is applied to the case of a parachute system to be worn on the back of the parachutist. But it should be well understood that this arrangement is chosen merely by way of example and has no limitative character. The parachute system might also be of any other type, for instance worn by the parachutist on the front, or resting on the seat and so on.

A parachute system according to the invention includes a container adapted to contain the parachute canopy, packed separately in said container, while certain other elements of the system, and in particular at least some (and preferably most) of the shroud lines through which the parachutist is to be suspended from the parachute canopy, are packed outside of said container.

For this purpose, according to the present invention, the parachute system is made in the following manner:

Concerning first the above mentioned container, it is made of one of the known types; for instance it includes, on the one hand a bottom I, which is secured, in any suitable manner, to the harness of the parachutist and, in particular, as shown to belt 2, and, on the other hand, flaps 3 adapted to be held in the closed position by a quick release device, which can be actuated either automatically or manually by the parachutist.

It should already be noted that, due to the fact that such a container contains substantially but the parachute canopy, it can be made of minimum size, especially as to height and also thickness, in opposition to what takes place with the existing systems in which account must be taken of the shape of the supporting cables above referred to.

Such a container is made of elongated shape, with the smaller dimension in the direction of height and it is located on either side of the belt, that is to say its height is distributed both above and below the waist line. Therefore, once it is in position, a substantial space is left free between the upper edge of the container and the shoulders of the parachutist.

Means are further provided for housing the shroud lines through which the parachutist is to be connected to the parachute canopy. Preferably, these means are disposed in the free space just above mentioned, and they consist preferably of an auxiliary container 4.

Advantageously, this auxiliary bag intended to contain the shroud lines is made relatively flexible, so that it can adapt itself to the shape of the back and even follow the deformations thereof, when, for instance, the parachutist is inclined as shown by Fig. 2. On this figure, I have shown, in dotted lines, at 8, a container of the usual type.

For instance, this container 4 may consist essentially of two walls of fabric connected together along their edges, one of these edges being detachably assembled to the other. One of these fabric elements is provided, on the inner face thereof, with devices 5 of the known type (for instance rubber wires) for temporarily keeping the shroud lines in a predetermined arrangement.

These shroud lines, starting from their point of fixation at 6 on the belt, first pass at 7 from the first container (which contains the parachute canopy) into container 4, where they are preferably guided, along the edges, by devices which can easily be released under the effect of the opening stresses. Then they are folded in zig-zag fashion in devices 5 and they return to the first container, where they are fixed to the parachute canopy.

Preferably, according to another feature of the invention, I provide means for making it possible to have easy access to said shroud lines, at any time. For this purpose, supposing that use is made of an auxiliary bag for the shroud lines, said bag is provided with at least one opening adapted to be readily operated whenever it is desired. According to a particular embodiment, I connect the two walls 4 of the bag, on their edges through securing means of the so-called "Zip fastener" type, as shown at 10 in Fig. 1.

I have also shown, on the drawing, a portion of the belt and of the manually operated release device 11 which is supposed to be carried by said belt. Preferably, according to another feature of the invention, the cable 12 which is controlled by this release device is fixed to the belt itself, for instance through two straps 13 provided thereon. This cable enters, at 14, into said container 1, 3.

Whatever be the particular embodiment that is chosen, I obtain, according to the invention, a device the operation of which results sufficiently clearly from the above description without making it necessary to enter into further explanations, and which involves many advantages over the apparatus for the same purpose as used up to the present time.

A first and considerable advantage is that it is possible, with the device according to the invention, to reduce the space occupied by the parachute system and to make it much easier to manipulate.

This advantage results, on the one hand, from the reduction of volume of the container the parachute canopy, due to the fact that the shroud lines are no longer contained in this container, and, on the other hand, from the fact that the auxiliary bag which contains said supporting cables can be made flat and flexible. In particular, when the parachutist equipped with the system is inclined frontwardly, the space occupied by the parachute system remains the same as when he is straight. On the contrary, with the usual container which are more cumbersome and more rigid, the space occupied by the system increases, due to the empty space 15 existing between the upper edge of the container and the shoulders of the parachutist, as shown by Fig. 2.

On the other hand, it is possible to have access, at any time, to the shroud lines, in a simple and quick manner, so as to permit of checking the good state thereof.

Finally, and chiefly, the parachute is safer in operation, because I provide a complete separation between the parachute canopy and the shroud lines, and, in this way, I avoid any possible interfering of these elements when the parachute is being opened very quickly.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the append claim.

What I claim is:

A parachute system, which comprises a canopy, shroud lines for connecting the canopy to the wearer, a container containing said canopy in a folded state, harness means to secure said container on the back of the wearer in a position extending above and below the waist and with its top edge spaced below the shoulders, a second container containing at least most of said shroud lines carried by said harness means on the back of the wearer above the first container and adjacent thereto, said second container with the shroud lines contained therein being more supple than said first container so as to conform to the upper part of the back of the wear.

RENE TAUTY.